(12) United States Patent
Baldovino et al.

(10) Patent No.: US 7,749,118 B2
(45) Date of Patent: Jul. 6, 2010

(54) TOOTHED BELT

(75) Inventors: Carlo Baldovino, Montesilvano (IT);
Marco Di Meco, Pescara (IT);
Tommaso Di Giacomo, San Martino Sulla Marrucina (IT)

(73) Assignee: Dayco Europe S.r.l., Frazione Scalo Chieti (IT)

( * ) Notice: Subject to any disclaimer, the term of this patent is extended or adjusted under 35 U.S.C. 154(b) by 326 days.

(21) Appl. No.: 10/590,224

(22) PCT Filed: Feb. 23, 2004

(86) PCT No.: PCT/IT2004/000081

§ 371 (c)(1),
(2), (4) Date: Apr. 2, 2007

(87) PCT Pub. No.: WO2005/080821

PCT Pub. Date: Sep. 1, 2005

(65) Prior Publication Data

US 2007/0240658 A1    Oct. 18, 2007

(51) Int. Cl.
*F16G 1/28* (2006.01)
(52) U.S. Cl. .................................. 474/205
(58) Field of Classification Search ............. None
See application file for complete search history.

(56) References Cited

U.S. PATENT DOCUMENTS

| | | | | |
|---|---|---|---|---|
| 2,585,583 A | * | 2/1952 | Pinkney | 525/329.3 |
| 4,099,422 A | * | 7/1978 | Cicognani et al. | 474/205 |
| 4,498,891 A | | 2/1985 | Mashimo et al. | |
| 5,306,213 A | * | 4/1994 | Nakajima et al. | 474/205 |
| 5,322,479 A | * | 6/1994 | Le Devehat | 474/101 |
| 5,387,160 A | | 2/1995 | Nakajima et al. | |

(Continued)

FOREIGN PATENT DOCUMENTS

EP        0549401        6/1993

(Continued)

OTHER PUBLICATIONS

Bayer, "Therban—Comparative properties", Internet Article, pp. 5.1-5.33, XP002301499, Retrieved by EPO from the internet on Oct. 19, 2000, URL:http://www.therban.com/intertherban/c1multimedia_en.nsf/SysAllByCMSInternalKey/CHar-5E3CG9/$File/compa_prop.pdf?openElement>.

(Continued)

*Primary Examiner*—John Q Nguyen
*Assistant Examiner*—Robert T Reese
(74) *Attorney, Agent, or Firm*—Frommer Lawrence & Haug LLP; Ronald R. Santucci

(57) ABSTRACT

Toothed belt for use in contact with oil and comprising a body and a number of teeth extending from at least one surface of the body; the teeth are coated by a fabric; a resistant layer comprising a plastomer based on fluorine with the addition of elastomeric material, in which the plastomer is present in a larger quantity than the elastomeric material, is applied by adhesion onto the coating fabric. The elastomeric material forming the body of the belt is a copolymer obtained from a dienic monomer and a monomer containing nitrile groups, in which the nitrile groups are between 33% and 49%, preferably 39%, in weight with respect to the copolymer.

50 Claims, 3 Drawing Sheets

U.S. PATENT DOCUMENTS

| | | | | |
|---|---|---|---|---|
| 5,967,922 | A * | 10/1999 | Ullein et al. | 474/111 |
| 6,358,171 | B1 | 3/2002 | Whitfield | |
| 6,419,775 | B1 | 7/2002 | MacKintosh et al. | |
| 6,945,891 | B2 * | 9/2005 | Knutson | 474/260 |
| 7,056,249 | B1 * | 6/2006 | Osako et al. | 474/260 |
| 7,396,884 | B2 * | 7/2008 | Achten | 525/387 |
| 2002/0015825 | A1 * | 2/2002 | Meco et al. | 428/172 |
| 2002/0098935 | A1 * | 7/2002 | Danhauer et al. | 474/261 |
| 2004/0033857 | A1 * | 2/2004 | Welk et al. | 474/263 |
| 2004/0127316 | A1 * | 7/2004 | Hashimoto et al. | 474/109 |
| 2007/0281814 | A1 | 12/2007 | Baldovino et al. | |

FOREIGN PATENT DOCUMENTS

| | | | |
|---|---|---|---|
| EP | 1 035 353 | A1 | 9/2000 |
| EP | 1035353 | A1 | 9/2000 |
| EP | 1 157 813 | A1 | 11/2001 |
| EP | 1157813 | A1 | 11/2001 |
| EP | 1217256 | A1 | 6/2002 |
| WO | 02/084144 | | 10/2002 |
| WO | WO 02/084144 | | 10/2002 |

OTHER PUBLICATIONS

Bayer, "Therban—Comparative properties", p. 5.1, (Oct. 19, 2004, XP002301510, cited to indicate the publication date of document XP002301499.

Anonymous, "Acrobat Reader Document Properties Summary Screenshot", XP-002301510, published on Oct. 19, 2004.

Bayer, "Therban—Comparative Properties", XP-002301499, published on Nov. 23, 2003; http:/www.therban.com/intertherban/c1multimedia_en.nsf/SysAllByCMSInternalKey/CHAR-5E3CG9/$File/compa_prop.pdf?OpenElement, retrieved on Oct. 19, 2004.

* cited by examiner

TOOTHED BELT

TECHNICAL FIELD

The present invention concerns a drive system comprising a toothed belt and, in particular, a toothed belt for use in an oil bath.

BACKGROUND ART

Toothed belts generally comprise a body made of elastomeric material, in which a number of longitudinal filiform resistant inserts, also called cords, are embedded, and a number of teeth coated in a coating fabric.

Each belt component contributes to increasing performance in terms of mechanical resistance, in order to reduce the risk of breakage of the belt and increase the specific power that can be transmitted.

The belt coating fabric increases the resistance to abrasion and therefore protects the work surface of the belt from wear due to rubbing between the sides and tops of the belt teeth and the sides and bottoms of the races of the pulley with which the belt interacts.

Furthermore the coating fabric reduces the friction coefficient on the work surface, reduces the deformability of the teeth and above all reinforces the roots of the teeth thus avoiding breakage.

The coating fabric used can consist of a single layer or, alternatively, can be a double layer in order to guarantee greater strength and rigidity. The fabric is normally treated with an adhesive, for example RFL (resorcinol and formaldehyde latex) to increase the adhesion between the body and the fabric.

Currently many drive systems use gears or chains instead of toothed belts. Both gears and chains are, however, complex systems to produce. Both chains and gears are noisier and operate exclusively with oil, furthermore during operation they are subject to greater elongation and therefore replacement with a belt permits greater meshing precision.

In addition to these main disadvantages, both chains and gears are very costly.

For these reasons it is expedient to replace chains and gears with toothed belts without having to perform any other modification to the drive system as a whole; in this case, therefore, the toothed belt would necessarily have to operate in contact with oil or even partially immersed in oil.

Numerous studies have already been carried out on toothed belts to ascertain whether they are able to operate in direct contact with oil. For example the United States patent U.S. Pat. No. 4,099,422 describes a toothed belt designed to be used in an oil bath and comprising a body made of elastomeric material, preferably epichlorohydrin and a double layer of fabric coating the teeth.

The patent application EP0549401 describes a toothed belt comprising a body consisting of a first layer in CSM or ACSM and a second layer on the tooth side consisting of a matrix of HNBR coated with a fabric treated with HNBR.

In contact with oil, in particular during meshing of the belt on the pulley, the elastomeric materials used to form the body of the belt are subject to undesired expansion which causes a reduction in mechanical characteristics, reduced adhesion and, due to dimensional variations, also less efficient meshing. Furthermore none of the known toothed belts are particularly resistant to wear.

All the above problems therefore lead to easier breakage of the belt and therefore a shorter average working life.

No toothed belt in use in contact with oil or partially immersed in oil is therefore able to resist the scheduled duration tests for use in vehicle drive systems.

DISCLOSURE OF THE INVENTION

The scope of the present invention is therefore to obtain a toothed belt that can be used in contact with oil or even partially immersed in oil without affecting the performance of the belt and maintaining the necessary mechanical characteristics of adhesion, resistance to wear and meshing precision.

According to the present invention said scope is achieved by a toothed belt according to claim 1.

According to the present invention, a drive system is also supplied according to claim 16.

BRIEF DESCRIPTION OF THE DRAWINGS

For a better understanding, the present invention is described also with reference to the attached figures, which show.

BEST MODE FOR CARRYING OUT THE INVENTION

Figure 1:
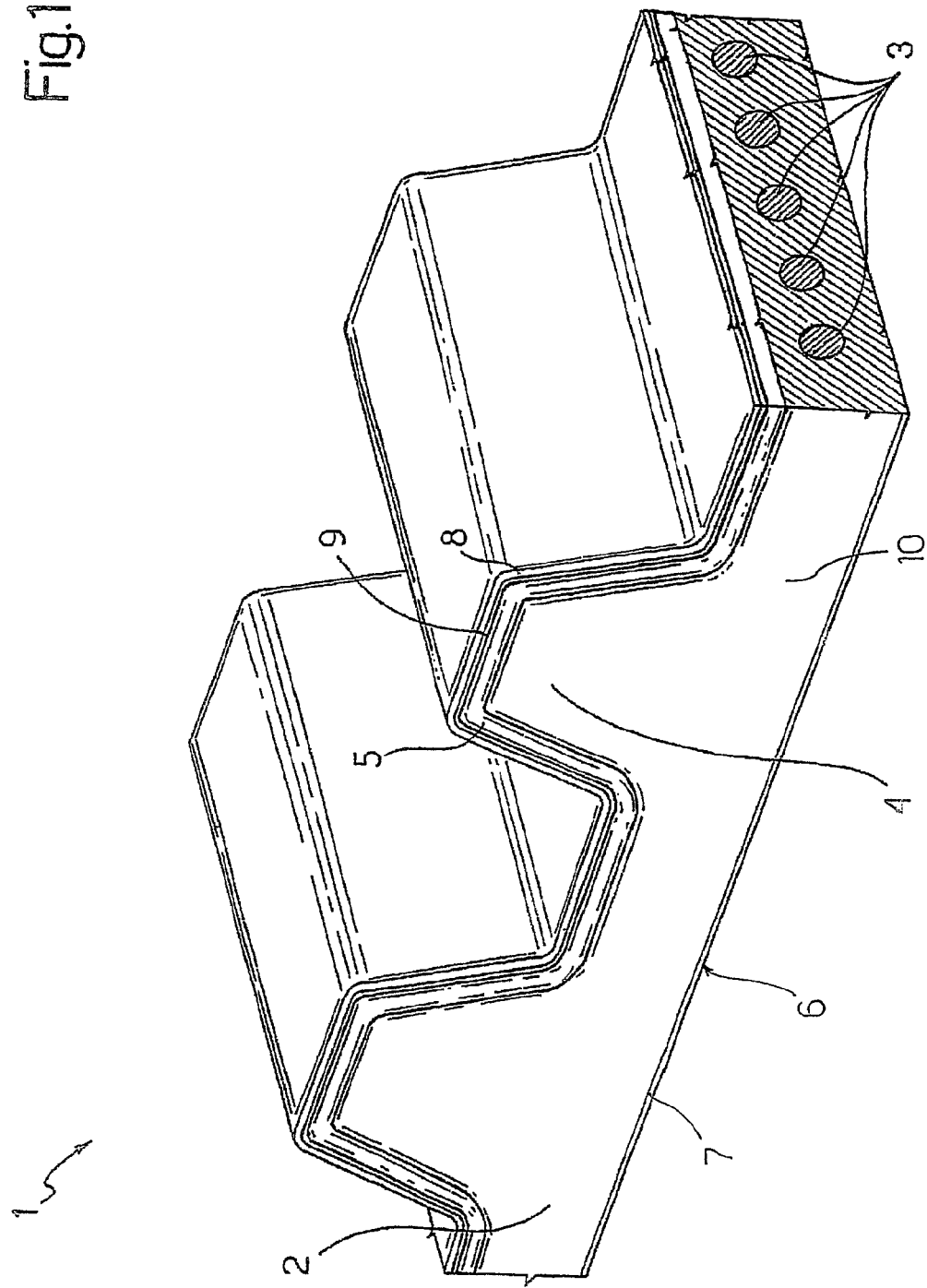
FIG. 1 is a perspective and partial view of a toothed belt according to the present invention.

FIG. 1 illustrates as a whole a toothed belt 1. The belt 1 comprises a body 2 made of elastomeric material, in which a number of longitudinal filiform resistant inserts 3 are embedded. The body 2 features a first face provided with teeth 4 coated by a coating fabric 5 and a second face or back 6 of the belt. Preferably the back 6 is also coated by a fabric 7.

Even more preferably the fabric 5 which coats the teeth 4 is the same as the fabric 7 that coats the back 6.

The body 2 comprises as main elastomer, or present in over 50% in weight with respect to other elastomers used in the compound, a copolymer formed from a monomer containing nitrile groups and one diene.

Preferably the copolymer used is hydrogenated butadiene acrylonitrile.

According to the present invention the copolymer used is obtained from monomers containing nitrile groups in a percentage of between 33 and 49% in weight with respect to the final copolymer.

Even more preferably the copolymer used is obtained from monomers containing nitrile groups in a percentage of 39% in weight with respect to the final copolymer, for example it is possible to use a mixture consisting of 50% THERBAN 3446 (Bayer registered trademark) and 50% THERBAN 4307 (Bayer registered trademark).

Advantageously the elastomer compound also comprises fibres, preferably in a percentage in weight of between 0.5 and 15% with respect to the elastomeric material and preferably having a length of between 0.1 and 10 mm.

The use of fibres maintains appropriate mechanical characteristics of the body compound and therefore helps to avoid occurrence of the above-mentioned problems.

In addition to the main elastomer, the elastomeric compound can also contain other elastomers and furthermore conventional additives such as, for example, reinforcing agents, fillers, pigments, stearic acid, accelerators, vulcanisation agents, antioxidants, activators, initiators, plasticisers, waxes, prevulcanisation inhibitors and similar.

For example, as filler carbon black or white filler can be used, which is generally added in a quantity of between 5 and 200 phr, preferably approximately 70 phr. Talc, calcium carbonate, silica and similar can also be added in a quantity generally between 5 and 150 phr or dispersions in oil containing fillers. Organosilanes can also be used in quantities of between 0.1 and 20 phr. Sulphur donor vulcanisation agents can be used, for example amino disulfides and polymeric polysulfides or free sulphur or organic and non-organic peroxides. The quantity added varies according to the type of rubber and the type of vulcanisation agent adopted and is generally between 0.1 and 10 phr. The antidegradation agents most commonly used in composition of the compound are microcrystalline waxes, paraffin waxes, monophenols, bisphenols, thiophenols, polyphenols, derivatives of hydroquinones, phosphites, mixtures of phosphates, thioesters, naphthylamines, diphenol amines, derivatives of substituted and non-substituted diarylamines, diarylphenylendiamines, paraphenylendiamines, quinolines and mixtures of amines. The antidegradation agents are generally used in quantities of between 0.1 and 10 phr. Representatives of the process oils that can be used are dithiobisbenzanilide, polyparadinitrosobenzene, xylilmercaptans, polyethlyene glycol, petroleum oils, vulcanised vegetable oils, phenolic resins, synthetic oils, petroleum resins, polymeric esters. The process oils can be used in a conventional quantity of between 0 and 140 phr. Among the initiators stearic acid is conventionally used in a quantity of between 1 and 4 phr. Conventional additives can also be added such as calcium oxide, zinc oxide and magnesium oxide, generally in a quantity of between 0.1 and 25 phr. Conventional accelerators are also used or combinations of accelerators such as, for example, amines, disulphides, guanidine, thiourea, thiazoles, sulphydryl compounds, sulphenamides, dithiocarbamates and xanthates generally in quantities of between 0.1 and 100 phr.

The fabric 5 coating the teeth 4 or the fabric 7 coating the back 6 can consist of one or more layers and can, for example, be obtained by means of the weaving technique known as 2×2 twill.

Fabrics 5, 7 preferably consist of a polymeric material, preferably aliphatic or aromatic polyamide, even more preferably polyamide 6/6 with high thermal resistance and toughness.

The fabrics 5, 7 can also be advantageously of the type in which each weave thread consists of an elastic thread as core and at least one composite thread wound on the elastic thread, where the composite thread comprises a thread with high thermal and mechanical resistance and at least one covering thread wound on the thread with high thermal and mechanical resistance.

A toothed belt 1 according to the present invention comprises a resistant layer 8 positioned on the outside of the fabric 5.

Preferably an adhesive 9 is also positioned between the fabric 5 and the resistant layer 8.

The resistant layer 8 consists of a fluorinated polymer plastic with the addition of an elastomeric material; the fluorinated polymer plastic is present in a larger quantity in weight with respect to the elastomeric material.

An example of a resistant layer which can be used is described, for example, in the patent EP1157813 in the name of the same applicant.

According to the present invention the fluorinated plastomer is preferably a compound based on polytetrafluoroethylene.

Preferably the elastomeric material with which the fluorinated polymer plastic is mixed to form the resistant layer 8 is HNBR, even more preferably it is an HNBR modified with a zinc salt of polymethacrylic acid, for example ZEOFORTE ZSC (Nippon Zeon registered trademark) can be used.

Preferably an adhesive material can be placed between the coating fabric 5 and the resistant layer 8.

Preferably, to ensure the necessary resistance, the resistant layer 8 has a weight of between 150 and 400 $g/m^2$, which is equivalent to an average thickness of between 0.050 and 1 mm.

Preferably the fluorinated polymer plastic is present in a quantity of between 101 and 150 in weight for 100 parts of elastomeric material.

The resistant layer 8 furthermore comprises a peroxide as vulcanisation agent. The peroxide is normally added in a quantity of between 1 and 15 parts in weight with respect to 100 parts of elastomeric material.

It has surprisingly been discovered that, for the compound constituting the body of the belt, the use of an elastomeric material with copolymer base formed of one diene and one monomer containing nitrile groups in a percentage of between 33 and 49% in weight with respect to the final copolymer, in combination with the use of a resistant layer 8 above the layer of fabric 5 coating the teeth 4 produced as previously described, eliminates the above-mentioned problems and, in particular, the reduction in mechanical characteristics, reduced adhesion, less efficient meshing and less resistance to wear.

Preferably the resistant layer 8 is also placed over the fabric 7 that coats the back 6, when said fabric 7 is present. In this case the resistant layer 8 prevents penetration of the oil also from the side of the back 6 of the toothed belt 1 and is particularly advantageous when the toothed belt 1 is used in control systems in which the back 6 of the belt is in contact with sliding blocks or tighteners. In these systems, in fact, the oil remains between the contact surface of the sliding block or tightener with the belt and the back of the belt, thus favouring penetration inside the compound constituting the body.

Preferably the toothed belt 1 can be treated on all the outer surfaces and, in particular, on the sides 10 where the body compound is more exposed to attack by the oil, with a rubber resistant to expansion, for example ENDURLAST (Lord registered trademark).

The resistant inserts 3 for the toothed belts of the present invention are made, for example, of high resistance fibreglass.

The resistant inserts are also treated with RFL and in particular with an RFL designed to prevent absorption. Preferably the RFL used comprises a latex formed of a monomer containing nitrile groups and one diene, for example HNBR or hydrogenated butadiene acrylonitrile. Even more preferably the latex is obtained from monomers containing nitrile groups in a weight percentage with respect to the final copolymer similar to the elastomeric material used to form the body of the toothed belt 1.

Experimentally it has been found that the use of resistant inserts made of material comprising high modulus fibres, aramidic fibres, PBO or carbon fibres or made of several materials such as, for example, carbon fibres together with fibreglass, when treated with an RFL comprising an oil-resistant material, helps to avoid the problems underlying the present invention.

The toothed belt 1 is vulcanised according to common known methods which are therefore not described in detail.

Figure 2:
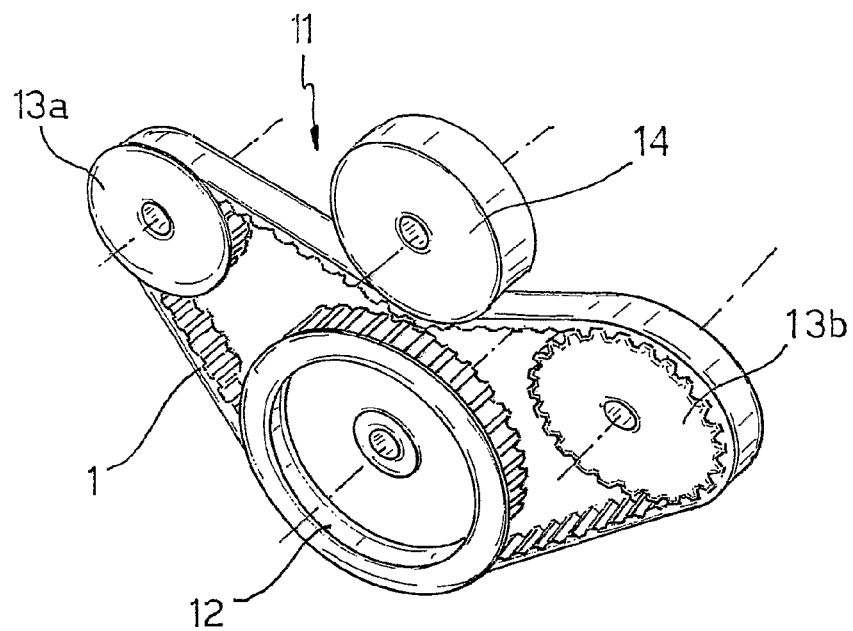
FIG. 2 is a diagram of a first timing control system using a first toothed belt according to the present invention.

The belt 1 according to the present invention can be used, for example, in a timing control system for a motor vehicle of the type shown in FIG. 2. The timing control system is shown in the figure as a whole by number 11 and comprises a drive pulley 12 rigidly fixed to the drive shaft, not illustrated, a first 13a and a second 13b driven pulley and a tightener 14 for tensioning the toothed belt.

Figure 3:
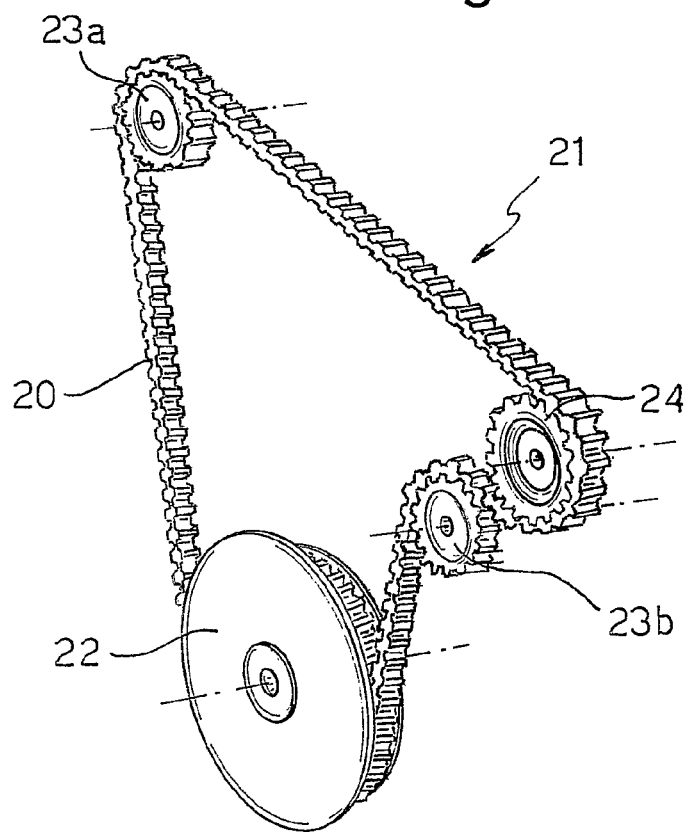
FIG. 3 is a diagram of a second timing control system using a second toothed belt according to the present invention.

According to a second alternative embodiment, illustrated in FIG. 3, number 20 refers to a toothed belt according to the present invention, which is provided with teeth on both faces and therefore features a resistant fabric that coats both sets of teeth.

A toothed belt 20 can, for example, be used in a timing control system for a motor vehicle of the type shown in FIG. 3. The timing control system is shown in the figure as a whole by number 21 and comprises a drive pulley 22 rigidly fixed to the drive shaft, not illustrated, a first 23a, a second 23b and a third 24 driven pulley.

Figure 4:
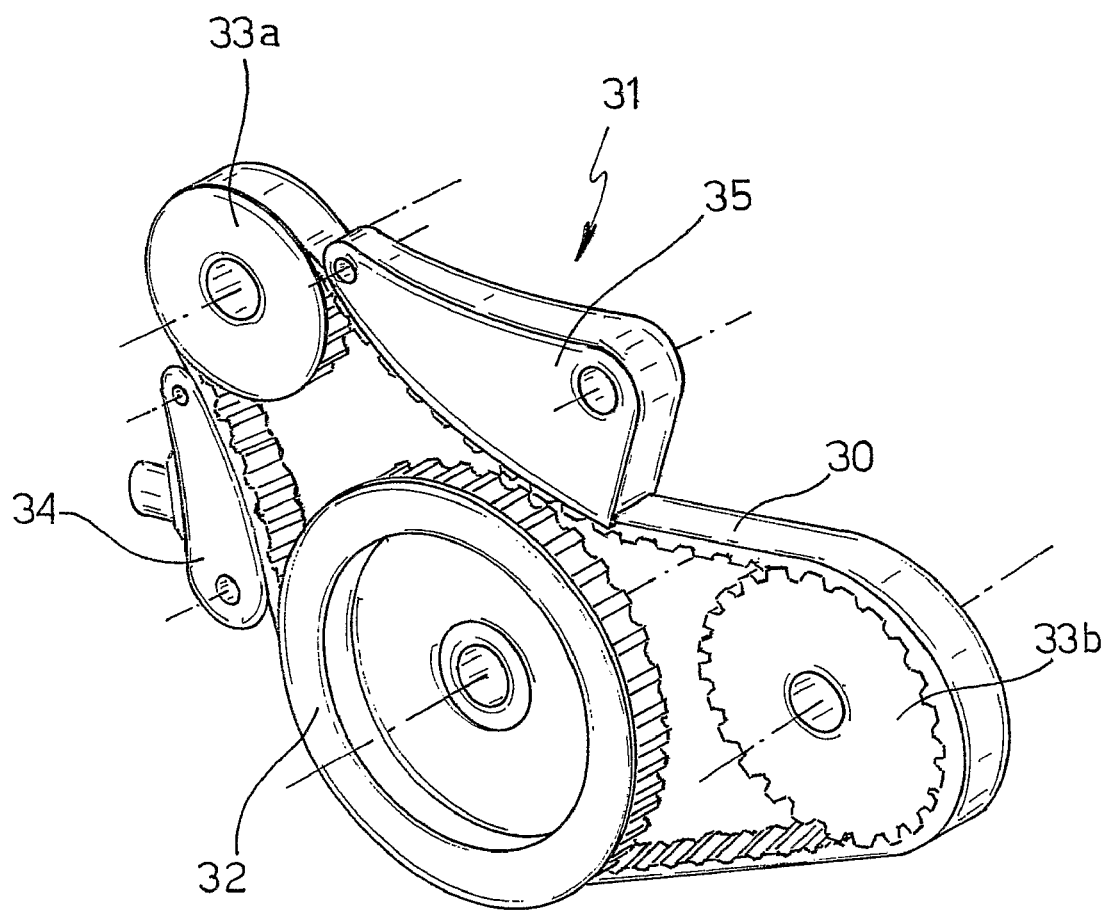
FIG. 4 is a diagram of a third timing control system using a third toothed belt according to the present invention.

According to a third embodiment of the present invention, illustrated in FIG. 4, a toothed belt 30 according to the present invention can advantageously be used in a timing control system shown in the figure as a whole by number 31, which comprises a drive pulley 32 rigidly fixed to the drive shaft, not illustrated, a first 33a and a second 33b driven pulley, a sliding block tightener 34 and a sliding block 35.

In use, the toothed belts 1, 20 and 30 in the respective control systems 11, 21 and 31 are in direct contact with oil.

The figures from 2 to 4 refer to control systems relating to the movement of balancing countershafts, but it is clear that the toothed belt according to the present invention can also be used in so-called "cam to cam" or for movement of the oil pump. In these cases the belt is partially immersed in an oil bath during operation.

Furthermore it is also possible to use the belt of the present invention in the main transmission for movement of the cams and also for movement of the injection pump in diesel engines.

In particular, the belt according to the invention has undergone duration tests in contact with oil. For the performance of these tests it was used on control systems comprising a drive pulley, a driven pulley and a tightener in which oil is sprayed by means of a pipe directly onto the belt.

The conditions in which the test was performed are shown in table 1.

TABLE 1

| | |
|---|---|
| Belt type | Dayco 122RPP + 150 |
| Speed | 6000 rpm |
| Specific load | 40 N/mm |
| Oil temperature | 140° C. |
| Oil quantity | 22 l/h |
| Number of drive pulley teeth | 22 |
| Number of driven pulley teeth | 44 |
| Tightener diameter | 47 mm |

The toothed belts tested in these conditions resisted at least 80,000,000 cycles.

From an examination of the characteristics of the toothed belt 1 produced according to the present invention the advantages that can be obtained with it are evident.

It has been experimentally ascertained that the combination of use of the resistant layer 8 on the fabric 5 with the elastomeric material used to form the body 2 of the toothed belt enables the toothed belts to pass the duration tests which they undergo for use in motor vehicles, therefore avoiding all the problems of the known toothed belts when used in contact with oil, in particular reduction of the mechanical characteristics, reduced adhesion, less efficient meshing and less resistance to wear.

The toothed belt according to the present invention will now be described also via non-restrictive examples.

Example 1

Table 2 shows the characteristics of a fluorinated polymer plastic which can be used in a resistant layer 8 according to the present invention.

TABLE 2

| ZONYL MP 1500 | |
|---|---|
| Average density ASTM D 1457 | 350-400 g/l |
| Melting temperature ASTM D 1457 | 325 ± 10° C. |
| Particle dimension distribution (Laser Microtac) | Average 6 μm |
| Specific surface area (Nitrogen Absorption) | 11 |

Example 2

The table 3 shows the characteristics of an elastomeric material in a resistant layer 8 according to the present invention.

TABLE 3

| ZETPOL 1010 | |
|---|---|
| Bonded acrylonitrile % in weight | 44% |
| Mooney unit MS 1 + 4 ml 100° C. | 78-92 |
| Specific gravity | 0.98 (g/cm$^3$) |

Example 3

Table 4 shows the chemical composition of a resistant layer 8 produced according to the present invention. Said resistant layer has a thickness of 0.250 mm.

TABLE 4

| | |
|---|---|
| Elastomeric material as per example 2 | 100 phr |
| Fluoropolymer-based additive as per example 1 | 125 phr |
| Peroxide | 6 phr |

The invention claimed is:

1. A method of providing a toothed belt for use in an oil-wet environment, the method comprising:
   providing a toothed belt and adapting said toothed belt for use in direct contact with oil or at least partially immersed in oil, said belt comprising a body, a number of teeth extending from at least one first surface of said body,
      said teeth being coated by a first fabric, said fabric being externally coated with a resistant layer, said resistant layer comprising
         a fluorinated plastomer,
         a first elastomeric material, and
         a vulcanisation agent,
      said fluorinated plastomer present in said resistant layer in a larger quantity than said first elastomeric material, said body comprising a compound based on a second elastomeric material formed of a copolymer obtained from a dienic monomer and a monomer containing nitrile groups, and said nitrile groups are in percentage between 33% and 49% in weight with respect to the weight of said copolymer.

2. The method of claim 1, wherein said nitrile groups are in percentage 39% in weight.

3. The method of claim 1, wherein said second elastomeric material further comprises hydrogenated butadiene acrylonitrile.

4. The method of claim 3, wherein said hydrogenated butadiene acrylonitrile is modified with a zinc salt of polymethacrylic acid.

5. The method of claim 1, wherein said resistant layer comprises said fluorinated plastomer in a quantity in weight of between 101 and 150 parts in weight with respect to said elastomeric material.

6. The method of claim 1, wherein said fluorinated plastomer is polytetrafluoroethylene.

7. The method of claim 1, wherein the back of said belt is coated by a second fabric.

8. The method of claim 1, wherein said second fabric is coated on the outside by a second resistant layer.

9. The method of claim 1, wherein said second resistant layer is equal to said first resistant layer.

10. The method of claim 1, wherein said elastomeric material comprises fibres.

11. The method of claim 10, wherein said fibres are present in a quantity in weight of between 0.5 and 15% with respect to said elastomeric material.

12. The method of claim 1, wherein the belt comprises resistant inserts chosen from the group consisting of aramidic fibres, PBO and carbon fibres.

13. The method of claim 12, wherein said resistant inserts have been treated with an RFL comprising an oil-resistant latex.

14. The method of claim 13, wherein said latex comprises an elastomeric material formed of a copolymer obtained from a dienic monomer and a monomer containing nitrile groups.

15. The method of claim 1, wherein said toothed belt comprises, between the teeth and said back, sides treated with a polymer resistant to expansion.

16. A method of using a toothed belt, the method comprising:
providing a toothed belt comprising:
a body;
a number of teeth extending from at least one first surface of said body;
said teeth being coated by a first fabric, said fabric being externally coated with a resistant layer, said resistant layer comprising:
a fluorinated plastomer;
said body comprising a compound based on an elastomeric material formed of a copolymer obtained from a dienic monomer and a monomer containing nitrile groups, and
said nitrile groups are in percentage between 33% and 49% in weight with respect to the weight of said copolymer; and
using said toothed belt in direct contact with oil or at least partially immersed in oil.

17. A timing control system for a motor vehicle engine comprising at least one drive pulley, one driven pulley, a toothed belt and means for maintaining said toothed belt in oil-wet condition; said toothed belt comprising a body and a number of teeth extending from at least one surface of said body; said teeth being coated by a fabric, said fabric being externally coated by a resistant layer, in which:
said resistant layer comprises a fluorinated plastomer, a first elastomeric material and a vulcanisation agent;
said fluorinated plastomer is present in said resistant layer in a larger quantity than said first elastomeric material;
said body comprises a compound based on a second elastomeric material formed of a copolymer obtained from a dienic monomer and a monomer containing nitrile groups; and
said nitrile groups are in percentage between 33% and 49% in weight with respect to the weight of said copolymer.

18. The timing control system of claim 17, wherein said nitrile groups are in percentage 39% in weight.

19. The timing control system of claim 17, wherein said second elastomeric material comprises hydrogenated butadiene acrylonitrile.

20. The timing control system of claim 19, wherein said hydrogenated butadiene acrylonitrile is modified with a zinc salt of polymethacrylic acid.

21. The timing control system of claim 17, wherein said resistant layer comprises said fluorinated plastomer in a quantity in weight of between 101 and 150 parts in weight with respect to said elastomeric material.

22. The timing control system of claim 17, wherein said fluorinated plastomer is polytetrafluoroethylene.

23. The timing control system of claim 17, wherein the back of said belt is coated by a second fabric.

24. The timing control system of claim 23, wherein said second fabric is externally coated by a second resistant layer.

25. The timing control system of claim 24, wherein said second resistant layer is equal to said first resistant layer.

26. The timing control system of claim 17, wherein said elastomeric material comprises fibres.

27. The timing control system of claim 26, wherein said fibres are present in a quantity in weight of between 0.5 and 15% with respect to said elastomeric material.

28. The timing control system of claim 17, wherein the belt further comprises resistant inserts chosen from the group consisting of aramidic fibres, PBO and carbon fibres.

29. The timing control system of claim 28, wherein said resistant inserts have been treated with an RFL comprising an oil-resistant latex.

30. The timing control system of claim 29, wherein said latex comprises an elastomeric material formed of a copolymer obtained from a dienic monomer and a monomer containing nitrile groups.

31. The timing control system of claim 17, wherein the belt further comprises, between the teeth and said back, sides treated with a polymer resistant to expansion.

32. The timing control system of claim 17, wherein the system further comprises a sliding block tightener or a sliding block.

33. An oil-resistant toothed belt comprising a body and a number of teeth extending from at least one first surface of said body; said teeth being coated by a first fabric, said fabric being externally coated with a resistant layer, said belt comprising:
said resistant layer comprising a fluorinated plastomer, a first elastomeric material and a vulcanisation agent;
said fluorinated plastomer present in said resistant layer in a larger quantity than said first elastomeric material;
said body comprising a compound based on a second elastomeric material formed of a copolymer obtained from a dienic monomer and a monomer containing nitrile groups; and said nitrile groups in a percentage between 33% and 49% in weight with respect to the weight of said copolymer.

34. The oil-resistant toothed belt of claim 33, wherein said belt is suitable to resist for its lifetime when used in direct contact or partially immersed in oil.

35. The oil-resistant toothed belt of claim 33, wherein said toothed belt is suitable to pass the duration tests which they undergo for use in motor vehicles.

36. The oil-resistant toothed belt of claim 33, wherein said belt resists at least 80,000,000 cycles in the duration tests which they undergo for use in motor vehicles.

37. The oil-resistant toothed belt of claim 33, wherein said nitrile groups are in percentage 39% in weight.

38. The oil-resistant toothed belt of claim 33, wherein said second elastomeric material comprises hydrogenated butadiene acrylonitrile.

39. The oil-resistant toothed belt of claim 38, wherein said hydrogenated butadiene acrylonitrile is modified with a zinc salt of polymethacrylic acid.

40. The oil-resistant toothed belt of claim 33, wherein said resistant layer comprises said fluorinated plastomer in a quantity in weight of between 101 and 150 parts in weight with respect to said elastomeric material.

41. The oil-resistant toothed belt of claim 33, wherein said fluorinated plastomer is polytetrafluoroethylene.

42. The oil-resistant toothed belt of claim 33, wherein the back of said belt is coated by a second fabric.

43. The oil-resistant toothed belt of claim 33, wherein said second fabric is coated on the outside by a second resistant layer.

44. The oil-resistant toothed belt of claim 33, wherein said second resistant layer is equal to said first resistant layer.

45. The oil-resistant toothed belt of claim 33, wherein said elastomeric material comprises fibres.

46. The oil-resistant toothed belt of claim 45, wherein said fibres are present in a quantity in weight of between 0.5 and 15% with respect to said elastomeric material.

47. The oil-resistant toothed belt of claim 33, wherein the belt further comprises resistant inserts chosen from the group consisting of aramidic fibres, PBO and carbon fibres.

48. The oil-resistant toothed belt of claim 47, wherein said resistant inserts have been treated with an RFL comprising an oil-resistant latex.

49. The oil-resistant toothed belt of claim 48, wherein said latex comprises an elastomeric material formed of a copolymer obtained from a dienic monomer and a monomer containing nitrile groups.

50. The oil-resistant toothed belt of claim 33, wherein the belt further comprises between the teeth and said back sides treated with a polymer resistant to expansion.

* * * * *